(12) United States Patent
Sastri et al.

(10) Patent No.: US 6,785,255 B2
(45) Date of Patent: Aug. 31, 2004

(54) ARCHITECTURE AND PROTOCOL FOR A WIRELESS COMMUNICATION NETWORK TO PROVIDE SCALABLE WEB SERVICES TO MOBILE ACCESS DEVICES

(76) Inventors: Bharat Sastri, 1527 Honeysuckle Ct., Pleasanton, CA (US) 94588; Shiv Balakrishnan, 13609 Westover Dr., Saratoga, CA (US) 97070

( * ) Notice: Subject to any disclaimer, the term of this patent is extended or adjusted under 35 U.S.C. 154(b) by 0 days.

(21) Appl. No.: 10/099,370

(22) Filed: Mar. 13, 2002

(65) Prior Publication Data

US 2002/0143856 A1 Oct. 3, 2002

Related U.S. Application Data

(60) Provisional application No. 60/275,593, filed on Mar. 13, 2001.

(51) Int. Cl.[7] .......................... H04Q 7/24; H04L 12/50; H04M 11/00; H04B 1/38
(52) U.S. Cl. .................... 370/338; 370/356; 379/93.01; 455/556.2
(58) Field of Search ................................ 370/228, 328, 370/351, 352, 356, 389, 392, 401, 329, 468, 338, 341, 521, 465; 709/224, 227, 236; 379/88.17, 93.01; 455/11.1, 556.2, 557, 569.1, 466

(56) References Cited

U.S. PATENT DOCUMENTS

| | | | | |
|---|---|---|---|---|
| 5,533,019 A | * | 7/1996 | Jayapalan | 370/352 |
| 5,793,762 A | * | 8/1998 | Penners et al. | 379/93.01 |
| 5,881,053 A | * | 3/1999 | Kimball | 370/335 |
| 5,953,322 A | * | 9/1999 | Kimball | 370/356 |
| 5,983,073 A | * | 11/1999 | Ditzik | 455/556.2 |
| 6,061,728 A | * | 5/2000 | Mead et al. | 709/227 |
| 6,081,536 A | * | 6/2000 | Gorsuch et al. | 370/465 |
| 6,097,733 A | * | 8/2000 | Basu et al. | 370/338 |
| 6,226,678 B1 | * | 5/2001 | Mattaway et al. | 709/230 |
| 6,421,720 B2 | * | 7/2002 | Fitzgerald | 709/224 |
| 6,496,477 B1 | * | 12/2002 | Perkins et al. | 370/351 |
| 2001/0043577 A1 | * | 11/2001 | Barany et al. | 370/401 |

* cited by examiner

*Primary Examiner*—Duc Ho
*Assistant Examiner*—Phuongchau Ba Nguyen
(74) *Attorney, Agent, or Firm*—Sawyer Law Group LLP

(57) ABSTRACT

A network architecture for small, low-cost, high functionality portable wireless devices which shifts many of the functions performed in typical handheld communication devices to a central Application Server (AS) computer. Communication between the AS and the portable devices is performed using standard Internet Protocol (IP) packets. The AS includes a Client Proxy Server (CPS) which interfaces to applications on the server, and Device Personality Objects (DPOs) that handle the special characteristics of each different types of portable devices. Each portable device has a unique CPS/DPO pair running on the AS that accepts input from the portable devices and provides input to the various applications on the AS and which accepts outputs from the various applications and passes it to the portable devices. Communication from the portable devices to the AS is entirely via IP packets.

10 Claims, 9 Drawing Sheets

ARCHITECTURE AND PROTOCOL FOR A WIRELESS COMMUNICATION NETWORK TO PROVIDE SCALABLE WEB SERVICES TO MOBILE ACCESS DEVICES

RELATED APPLICATION

This application is a non-provisional application of provisional application 60/275,593 filed Mar. 13, 2001. Priority of application 60/275,593 is claimed for this application.

FIELD OF THE INVENTION

The present invention relates to communications and more particularly wireless communication systems.

BACKGROUND OF THE INVENTION

The functionality of cellular telephones and other hand-held communication devices has been increasing rapidly. Internet enabled cellular phones and personal digital assistants (PDAs) that can communicate via the internet are now in widespread use.

A variety of digital communication protocols have been developed. A number of non-compatible communication protocols and air interfaces such as PDC/PHS, TDMA, CDMA, GSM and IEEE 802.11x have each been deployed in the market. However no protocol is ubiquitous. In fact many communication systems incorporate one or more of these protocols to deliver services to their customers.

Third generation wireless protocols that handle voice, video and data are being developed. The third generation protocols are designed to handle voice, video, and data communication over devices such as cellular phones, PDAs and laptop computers.

A typical hand held communication device (e.g. cellular phone or PDA) is relatively complex. Almost all handheld communication devices include a keypad/keyboard and also include a display device (of varying resolution), which may in many cases be a touch-screen. The technical complexities of these handheld devices make them relatively expensive. In order to encourage widespread usage of such communication devices, some network service providers subsidize the cost of these hand-held communication devices.

Additionally because of the difference in the feature sets and processing power available in these communication devices, there is no efficient and low cost method to deliver standard content to all devices. A number of attempts such as the Wireless Application Protocol have been created. WAP requires the execution of a browser on the cellular phone or PDAs. This browser then makes custom requests to the target web applications. The web application also needs to be modified to format the content to match the capabilities of the hand-held device in use. Rewriting and reformatting of content is an impediment to the deployment of a variety of applications to customers. The requirement to execute a browser on the hand-held device generally requires a processor, large memory, a display etc. adding to the cost of the device. It also results in relatively large power consumption leading to relatively short battery life.

The architecture for a typical prior art handheld mobile device is shown in FIG. 1. The components of a typical prior art handheld device include a microprocessor 185 and associated RAM and Flash memory 184. The microprocessor 185 executes the resident software and controls the input/output devices. The input/output devices include devices such as microphone/speaker 183, keypad/board 181, display device 182, a codex 186, a radio transceiver 189 and often a DSP 187 for analog signal processing. In view of the number of components and the complexity prior art hand-held devices are relatively expensive and they use a relatively large amount of power.

The present invention is directed to a system and method which will accommodate relatively low cost hand held devices that use a relatively small amount of power.

SUMMARY OF THE PRESENT INVENTION

The present invention provides a system that can accommodate very simple, low cost portable (i.e. hand held) devices that use a very small amount of power. The system includes a central server, that runs a variety of applications and which has a module associated with each portable device. Each portable device communicates with its associated module using wireless communication and the well known Internet Protocol (IP) that has been developed for the internet. With the present invention the portable device merely sends and receives IP packets. The portable device does not include a browser.

The present invention provides an Internet Protocol based system and method that may be implemented over a heterogeneous wireless communication network. A system operating in accordance with the present invention includes:

1. A set of hardware components that enable radio communication and IP packetization. The system includes a Software Defined Radio (SDR) and Application Specific Device (ASD) modules.

2. Matching software protocol programs: The system includes a Client Proxy Server (CPS) and a Device Personality Object (DPO) program pair that executes at an Application Server (AS). The CPS/DPO program pair abstracts all the device dependencies from the application and uniquely maps the mobile access device to the target application. The CPS/DPO program pair contains all of the information required to map content and translate requests to and from the application and to the accessing mobile device. There is a unique CPS/DPO program pair for each mobile device that is active.

Data is exchanged between the hand-held communication devices and cellular wireless base stations using IP data packets. All devices can use this IP packet transmission protocol to allow for frequency sharing and compatibility with existing internet infrastructure.

The system can include very small, very low power hand-held devices, that do not include a dial/key pad, large data storage or a complex microprocessor based platform and can be low cost and low power devices.

Each hand-held device is logged into the internet via the base station and results in the spawning of a CPS/DPO program pair at the Application Server (AS) where the target application resides. CPS establishes a session for each remote wireless device. A single CPS can have multiple DPOs, each DPO being a plug-in software object. The DPO is responsible for translating the device requests to the application in use and also for translating the applications responses to the appropriate format required by the requesting mobile device. A very small footprint or "lightweight" software component is embedded in each hand-held device and is responsible for IP packet management.

The Application server is typically a large computer with enormous power. By executing this complex code i.e. the CPS/DPO combination, at the Application Server it is possible to provide rich applications to simple, low-cost mobile or handheld devices. The cost of complex microprocessor based devices may be dispensed with. This enables the manufacture and deployment of very low-cost wireless hand-held devices for Internet access. The computational capability at the AS is generally capable of handling thousands of such CPS/DPO sessions in parallel enabling a practical way to deploy services.

This method also enables rapid deployment of applications by simply deploying the appropriate DPO for a particular mobile device class at the "head end" of the network i.e. at the AS. This ability to harness the computing power of the Application Server also results in better security, customer experience etc.

DETAILED DESCRIPTION

Figure 1:
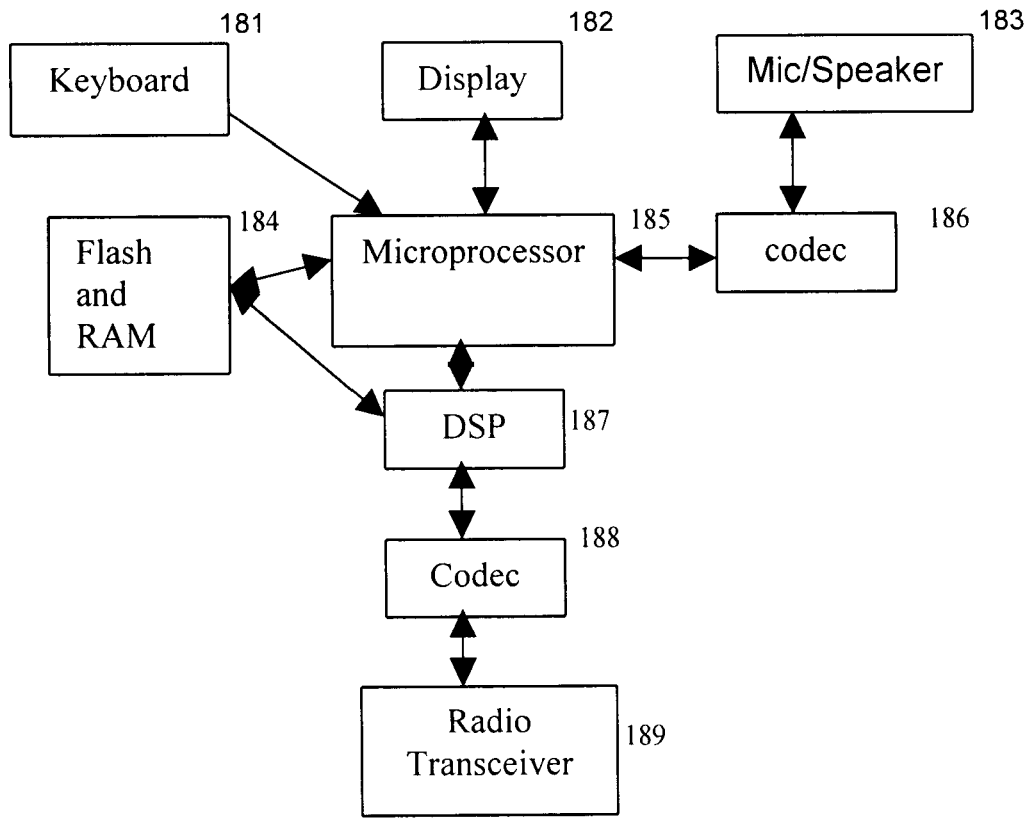
FIG. 1 shows the components in a typical prior art hand-held communication device.
Figure 2:
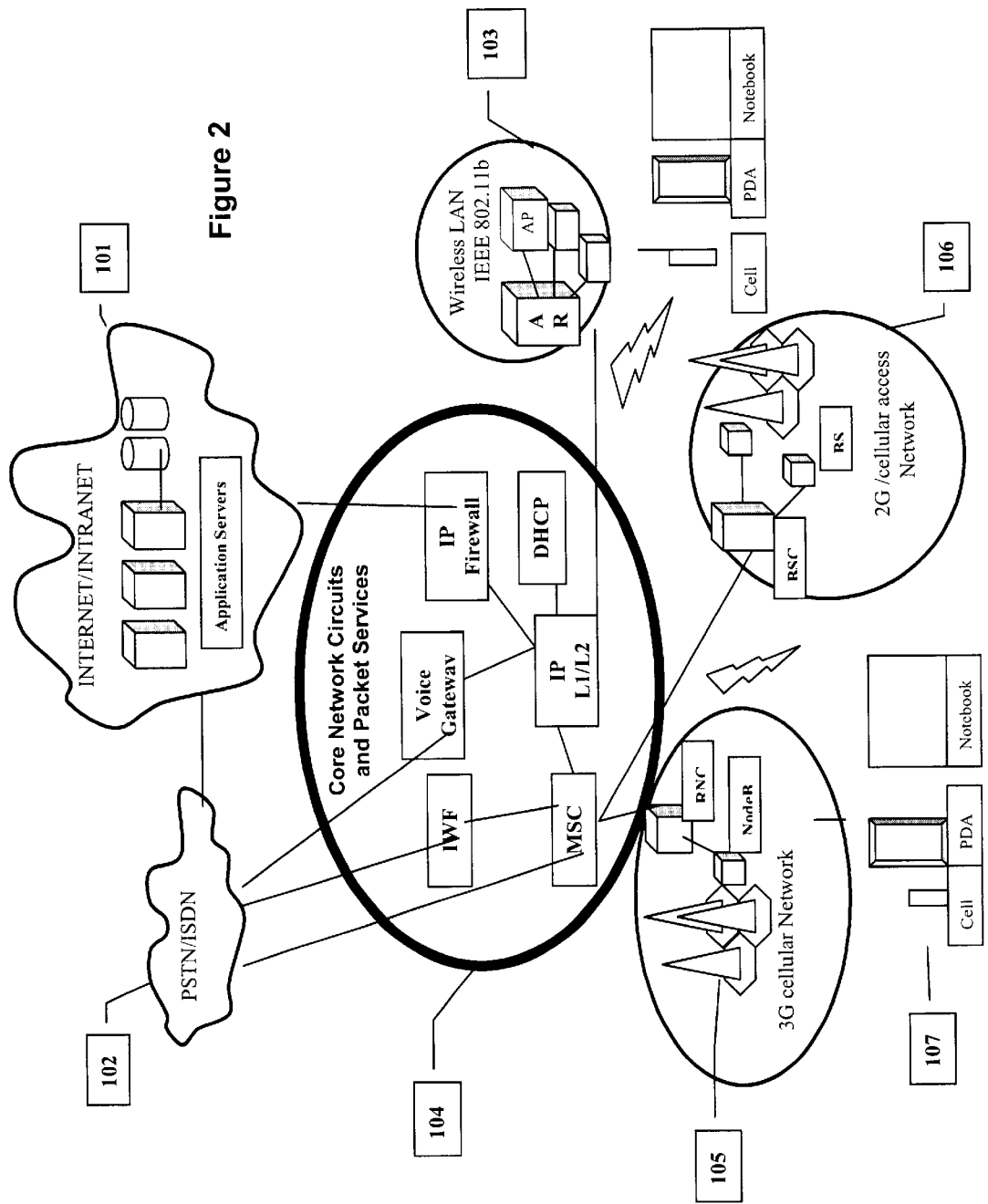
FIG. 2 is an overall diagram that shows an IP based wireless/mobile network

An overall diagram of a preferred embodiment of the present invention is shown in FIG. 2. The architecture of the system shown in FIG. 2 provides an all IP-wireless/mobile network. The present invention provides a network architecture, an application protocol and devices for small, low-cost, high functionality wireless communications. The present invention shifts many of the functions performed in a typical handheld communication devices to a powerful Application Server (AS) computer 101 via a connection with a wireless Base Station/Controller through a Message Switching Center 104. The hand held device communicate with the AS using IP packets; however, the portable device do not include a browser. The hand held device merely packetizer input and send it to the AS. The AS processes the information, executes the appropriate application program and sends packets back to the hand held device. At the handheld device the data stream from the AS is de-packetized and provided to the user.

The various components of the system shown in FIG. 2 will now be described. The main components of the system are a number of application servers 101 connected via a conventional internet of intranet network, a group of Core Network circuits and packet services 104, and cellular access networks 105 and 106

The system includes one or more instances of an IEEE802.11b Wireless LAN 103, a 2G cellular access network 106, a 3G cellular access network 105, the core network Circuit and Packet services infrastructure 104, a PSTN/ISDN network 102, an Internet/intranet cloud of Application Servers 101. Also shown are a set of ubiquitous mobile devices e.g a cell phone, a PDA, a Notebook computer 107.

The IEEE 802.11b Wireless LAN 103 provides access points (AP in block 103) and Access Routers (AR in block 103) connectivity to the core services network 104.

The 2G cellular access network 106 has antennas, base stations and base station controllers in place. The cellular devices 107, connect to the Base Station (BS in block 106) and multiple base stations are controlled by a Base Station Controller (BSC in block 106). Multiple BSCs are then connected to the Message Switching Center (MSC in block 104) in the core services network 104

Each of the outer access networks 103,105,106, 102,101 is serviced by a network infrastructure 104, that provides core network circuit and packet switching services such as Message Switching Centers (MSC in block 104), IP Layers 1&2 (IP L1/L2 in block 104), DHCP services (DHCP in block 104), Voice Gateway (Voice Gateway in block 104), IP Firewall (IP Firewall in block 104)

Any of the mobile devices 107, have the ability to connect to any of the wireless access networks 105,103 or 106 to access any resource available on the network including the Application Servers 101. The exact wireless protocol used make a unique connection i.e. is unique when connecting to the wireless networks 103,105,106 shown.

With the present invention all the heavy-duty computation and data storage is performed by the various blocks in the network from the Base Stations (BS in 106, FIG. 2) through the Application Servers 101 shown in FIG. 2, A user has access to functions such as e-mail, voice-mail, calendars etc via voice command that are recognized and executed at the appropriate remote Application Server (FIG. 2 101) as opposed to on the mobile device. Also no local data storage is required on the mobile device. A user can store their entire contact database at the remote Application Server. This enables the mobile access device to become a simple low-cost, low-power device. It will be clear to those skilled in the art that the mobile device could be any other data/voice device such as a PDA or a Notebook computer. Various types of devices can be connected. Each device has an ASD. A particular bit pattern generated by the ASD indicates the device type or device class. This is used to deploy the appropriate software components in the Application Server.

Figure 7:
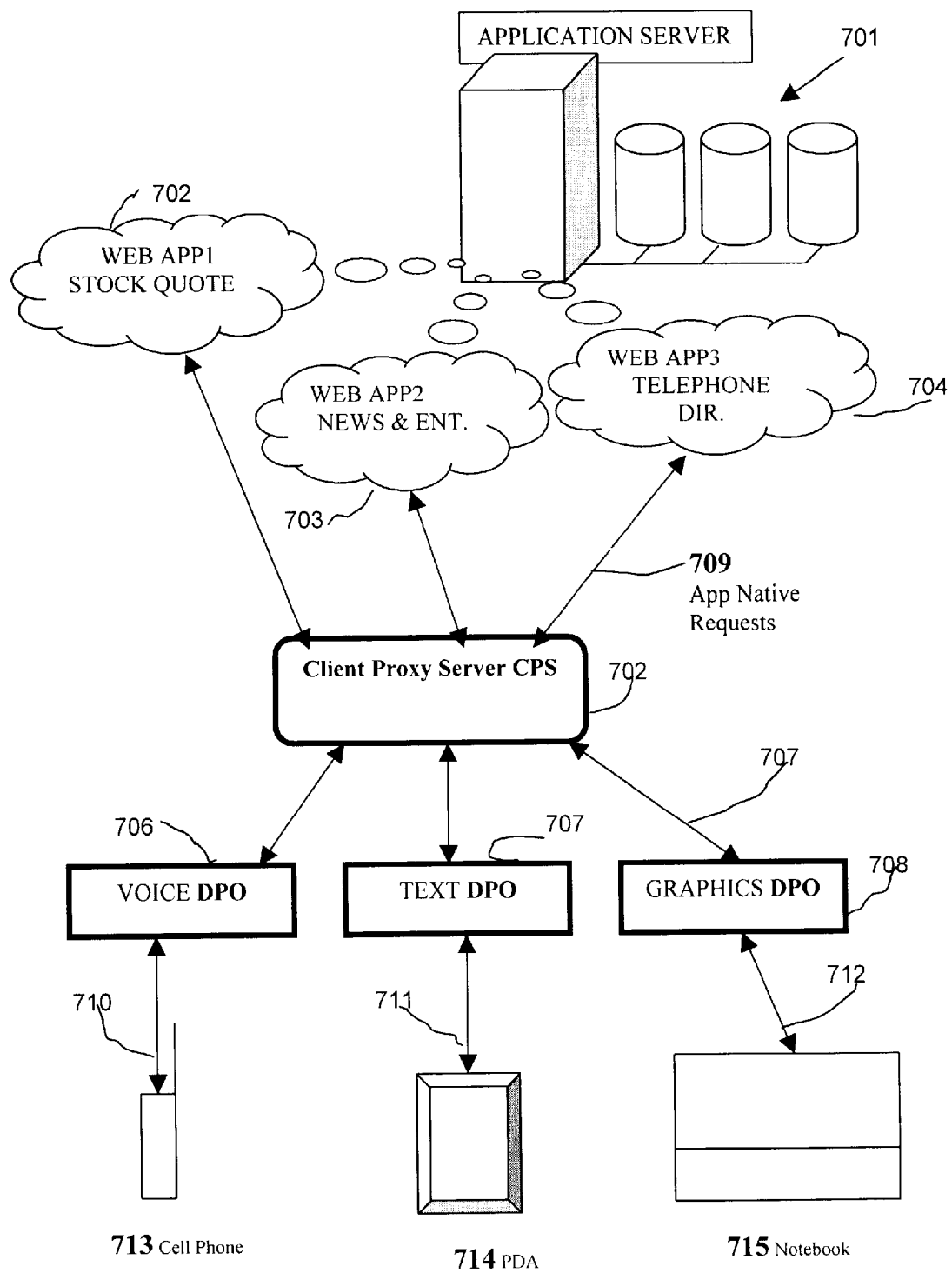
FIG. 7 is a diagram that shows the Software Hierarchy at the Application Server. It shows the CPS and DPO components that are required to realize present invention

FIG. 7 shows the software environment executing at the Application Servers (FIG. 2, 101) resource. In this diagram the Application Server 701, is a powerful computing and data storage resource available to any device connected to the Internet. The diagram shows three native web Applications—Web App1-Stock Quote 702, Web App2-News & Ent. 703 and Web App3-Telephone Directory 704. Also shown are three ubiquitous mobile access devices—a cell phone 713, a PDA 714 and a notebook computer 715, that are accessing the web applications 702,703,704 at the Application server 701. Each Application Server 701 has a program called the Client Proxy Server 705. The Client Proxy Server 705 is part of the present invention and is responsible for managing the application sessions for each connected mobile access device. It creates logical connection channels for the client device. An important aspect of this invention is the ability of any mobile device to connect to any Internet application and be serviced in a graceful scalable manner. The present invention accomplishes this by implementing a set of programs called Device Personality Objects (DPOs) that abstract all the device dependencies from the target application. These DPOs can be defined to service various classes of mobile devices. Examples of such classes and the associated mobile access devices are: Voice Only DPO—(telephone) 706, Text DPO—(PDA+phone) 707, Graphics DPO—(Notebook computers) 708, but not limited to these.

Service or applications requests from the access device are routed to the appropriate DPO 706,707,708, at the Application Server 701. The appropriate DPO 706,707,708 then translates the mobile access device dependencies and creates a payload for the target web application 702,703,704, and sends it to the Client Proxy Server 705. The CPS 705 manages the order of requests and ensures coherency of the message stream.

When the web application 702,703,704 responds to a request, the CPS 705 routes the payload to the correct DPO 706,707,708. The appropriate DPO then translates the payload into a format that is compatible with the target mobile requesting device 713,714,715. If the requestor is a Voice-Only device the Voice Only DPO 706 will translate the application response into a voice or audio stream 710. This stream 710 is easily understood at the Cell Phone 713, which is a voice/audio device.

The value of this approach is that any new set of devices with richer functionality may be supported by simply writing and deploying the required DPO 706,707,708 for that class of devices, at the Application server. These DPOs may also be deployed at various nodes in the networks e.g. at Base Stations if needed by a particular application.

The benefit derived from this architecture is that existing Internet application can be made available to very low cost devices in a useful manner without having to reformat the application or its content for each specific device. It eliminates the need for creation of one-off protocols like Wireless Application Protocol (WAP) for cellular phones. WAP requires the execution of a web browser on the users mobile device. This custom WAP browser makes specially formatted requests to a WAP customized application that has to manage custom content for each different WAP device. A drawback of this approach is the high minimum capability required of the mobile device. In general in a WAP system the mobile device needs to have a powerful microprocessor, a display, a keypad etc all of which make it a relatively high cost device.

Figure 4:
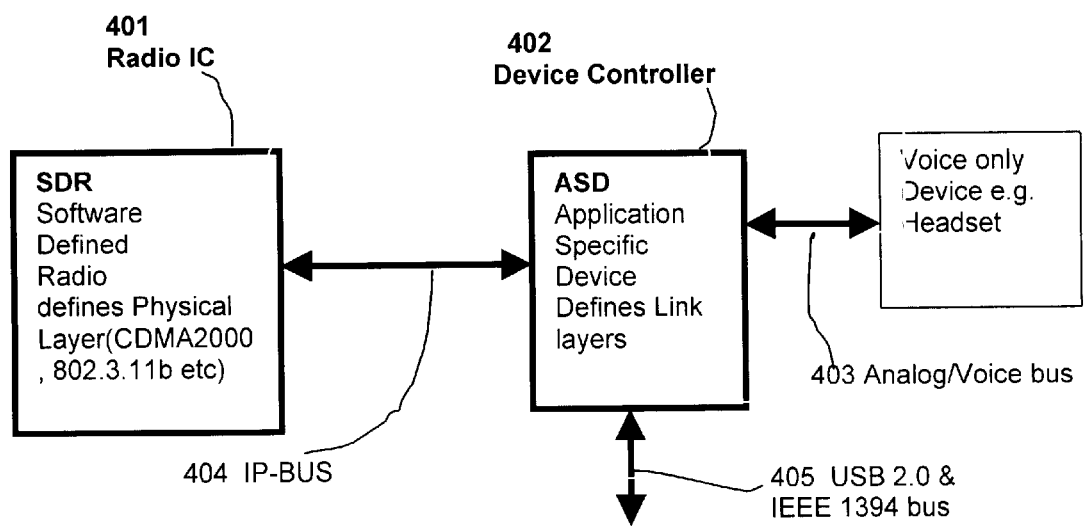
FIG. 4 is a diagram of the hardware components that separate the radio transceiver from the application specific device interface.
Figure 6:
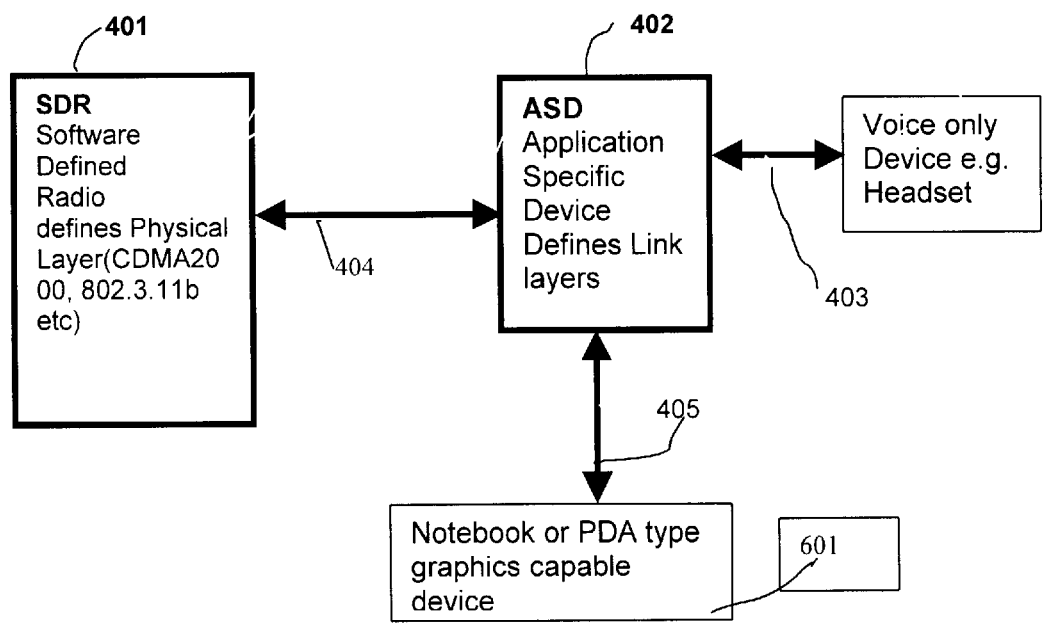
FIG. 6 shows a more general implementation of the present invention to interface multiple types of hand-held or mobile devices e.g. a PDA or a Notebook computer.

As shown in FIG. 4 and FIG. 6, the invention embodies a multiple standards compatible Software Defined Radio (SDR) 401 with a universal interface (IP-BUS) 404 for connecting to mobile devices. The invention also includes a Application Specific Device (ASD) 402 component that provides standard interfaces. As shown in FIG. 6, the ASD 402 has a USB 2.0, IEEE 1394 bus at one end and the IP-BUS at the other end. Devices such as a notebook or PDA 601 connect to the ASD via the USB 2.0, IEEE 1394 bus as shown in FIG. 6. The ASD also contains the logic to support the packetization/de-packetization of IP data packets. The combination of the SDR and ASD is all that is required to implement low cost mobile devices. It is noted that software defined radios are known in the art. For example see: Gang Wu & Mitsuhiko Mizuno, Comm. Research Lab, Japan; Paul J. M. Havinga Univ. of Twente,—"MIRAI Architecture for Heterogeneous Network" IEEE Communication Mag Feb 20002. The content of this reference is hereby incorporated herein by reference.

Figure 5:
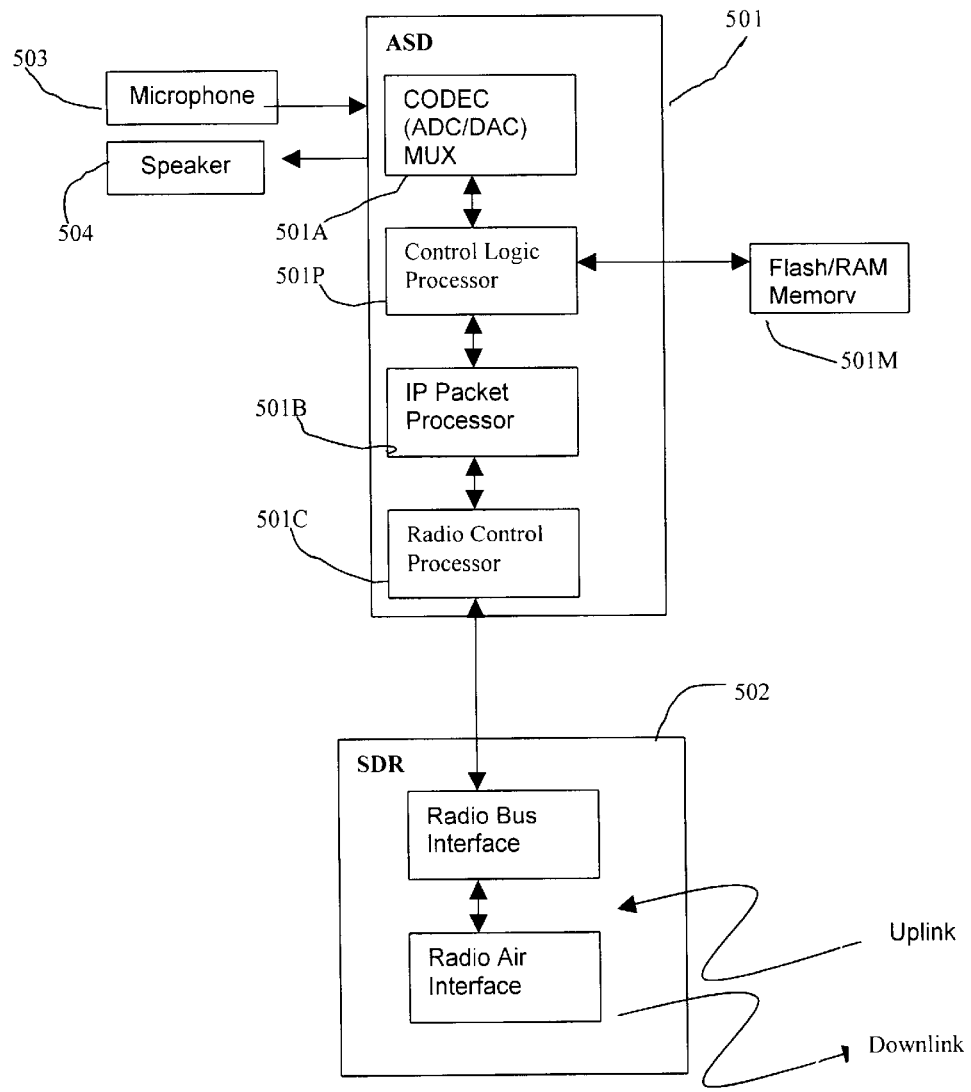
FIG. 5 shows the minimum set of components that remain in a simplified low-cost hand-held communication device with the present invention.

An example of a specific portable device constructed in accordance with the present invention is shown in FIG. 5. The device includes an Application specific Device (ASD) 501 and a SDR 502. The radio transceiver SDR 502 is programmable to use standard wireless signaling methods e.g. IS-95 cdma or CDMA 2000, or IEEE 802.11b DSSS mechanisms, to communicate to the nearest base station or access point. The radio may be programmed to adapt to the available air interface. The SDR 502 includes a conventional Radio Bus Interface and a conventional Radio Air Interface With the present invention the handheld/mobile device need not include a keyboard or a display. For instance in the case of a voice/telephony only application, the input and output from the handheld device is audio data in the form of IP packets. FIG. 5 illustrates an ASD that include a coder 501A to digitize the audio, a packetizer 501B and a radio control processor block 501C to program the SDR to the appropriate mode. The entire device is controlled by a Control logic processor 501P that performs a conventional control program stored in Flash memory 501M.

With the present invention all the heavy-duty computation and data storage is performed by the various blocks in the network from the Base Station through the Application Servers shown in FIG. 2. A user has access to functions such as e-mail, voice-mail, calendars etc via voice command that are recognized and executed at the appropriate remote Application Server as opposed to on the mobile device. Also no local data storage is required on the mobile device. A user can store their entire contact database at the remote Application Server. This enables the mobile access device to become a simple low-cost, low-power device. It will be clear to those skilled in the art that the mobile device could be any other data/voice device such as a PDA or a Notebook computer. Various types of devices can be connected. A particular bit pattern generated by the ASD indicates the device type or device class. This is used to deploy the appropriate software components in the Application Server.

An important aspect of this invention is the ability of any mobile device to connect to any Internet application and be serviced in a graceful scalable manner. This is accomplished by implementing a set of programs called Device Personality Objects (DPOs) that abstract all the device dependencies from the target application. These DPOs can be defined to service various classes of mobile devices. Examples of classes of devices are. "Voice Only-telephone", "Text Only—pager", "Voice and Data—PDA+phone", "Graphics & Audio—Notebook" devices, but not limited to these. The value of this approach is that any new set of devices with richer functionality may be supported by simply writing and deploying the required DPO program for that class of devices, at the Application server. These DPOs may also be deployed at various nodes in the networks e.g. at Base Stations if needed by a particular application.

The great benefit derived from this architecture is that existing Internet application can be made available to very low cost devices in a useful manner without having to reformat the application or its content for each specific device. It eliminates the need for creation of one-off protocols like Wireless Application Protocol (WAP) for cellular phones. WAP requires the execution of a web browser on the users mobile device. This custom browser makes specially formatted requests to a WAP customized application that has to manage custom content for each different WAP device. A drawback of this approach is the high minimum capability required of the mobile device. It needs to have a powerful microprocessor, a display, a keypad etc all of which make it a much higher cost device.

The present invention takes advantage of the existing and robust IP packet data network and enables unique applications such as "Voice Based Multi-party Instant Messaging" which would not be feasible using current point-to-point methodology required by existing wireless communication systems.

The present invention allows mobile devices to communicate with the nearest wireless base station or wireless access point. The local connection is established using DHCP protocol. Also the Mobile IP standard is utilized to maintain a pair of IP addresses per mobile device i.e. a "home IP address" and a ""care-of IP address." These support IP based mobility of the device when needed Since these connections are based on an IP data packet protocol, it enables all such devices within a cell to multiplex the air interface and use the bandwidth more efficiently. It is also enables all the devices within that cell to message each other using standard IP messaging applications such as Instant Messaging in an efficient manner with the base station acting as a router. If the DPOs are deployed on a Base Station, it will enable heterogeneous devices to communicate in a localized network thereby improving latency and performance.

The application architecture is an overlay on top of TCP/IP and abstracts the existing Link and Physical layer infrastructure available. This structure may be IS-95 cdma or CDMA2000 or IEEE802.3.11a or the proposed IEEE802.3.11g standard. This method uses digital data for both voice (VoIP) and data transmission.

The value that this application protocol provides is that it enables existing IP based web applications to support multiple end-user devices in a scalable device specific manner without re-writing the application.

Hence a very simple "voice only" telephony device may be used to access voice and data services. This simple device has no keyboard or display and can therefore be very low cost. In its most basic form it is simply a voice driven mobile access device.

Figure 8:
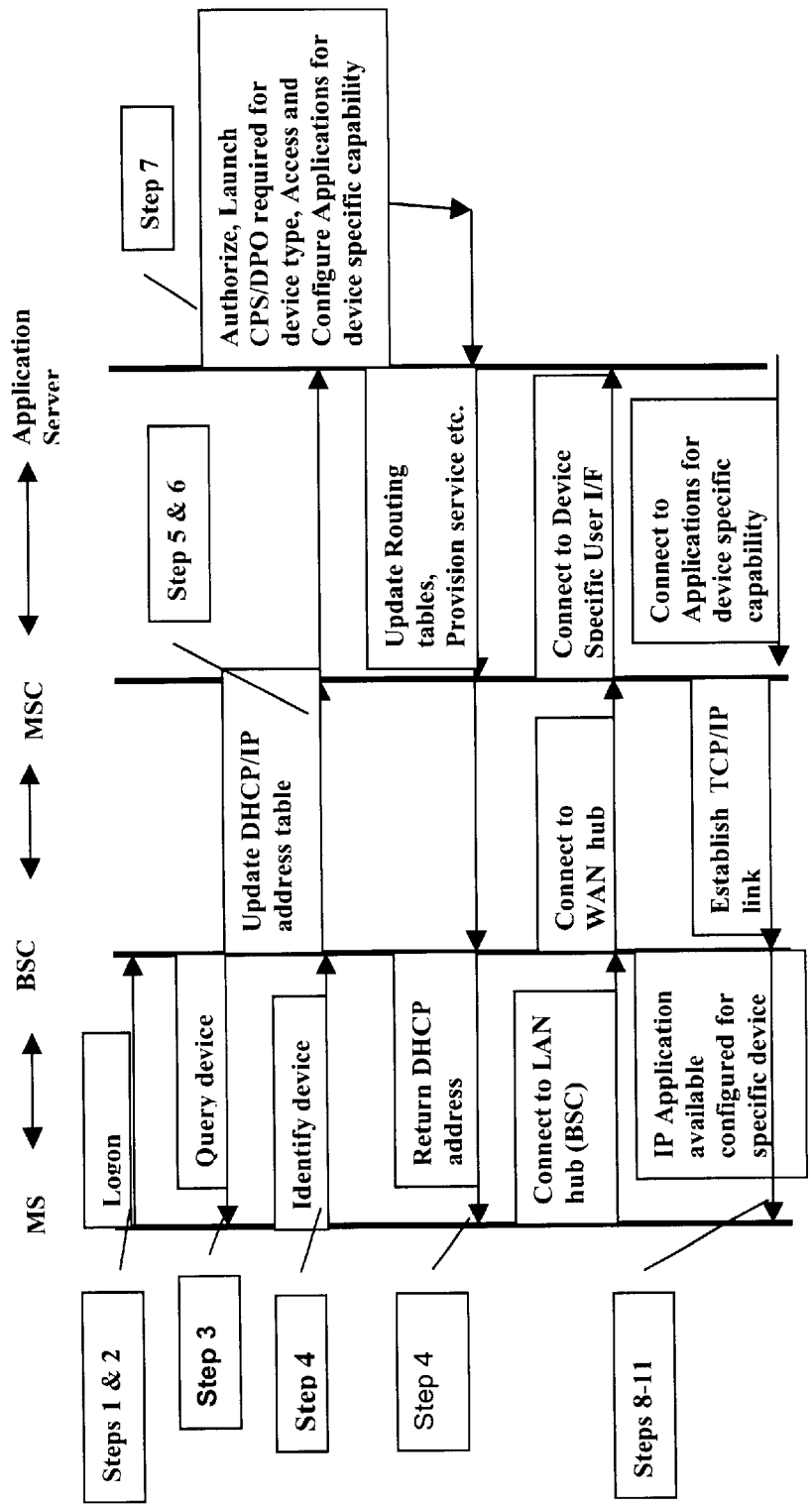
FIG. 8 is a diagram that shows the handshake between the mobile device and the target Application Server including the execution of the Client Proxy Server (CPS) program at the Application Server (AS) and ensuing application session.

The steps performed during the operation of the invention are illustrated in FIG. 8

EXAMPLE 1

A Voice/Telephony Application Using VoIP

A user has a minimal mobile incorporating an ASD (Application Specific Device) and a Software Defined Radio transceiver (SDR) connected to a headset with the custom controller (see FIG. 5). This user can avail of web applications in the following manner: (as shown in FIG. 8).

Step 1. The user turns on the radio.

Step 2. The radio establishes contact with the nearest base station (BSC) using the appropriate air interface (RF protocol) and requests a network connection.

Step 3. The base station queries the device for its "Device Type".

Step 4 The device identifies itself as a "voice only" class mobile IP device. The Base Station passes the request to the base station controller BSC.

Step 5 The base station (BSC) proceeds to issue a DHCP address to the device and also informs the Message Switching Center (MSC) about the device and its associated DHCP generated "care of IP address".

Step 6. The MSC performs the authorization, creates the IP address pair "home IP" and "care of" required to map the mobile device into its routing tables. It then connects with the Application server and invokes the appropriate Client Server Proxy CPS/DPO program pair for the specific device (In this case a "voice only" device). It then sends an acknowledgement to the MSC. The MSC then updates its internal mapping and routing tables and returns a valid DHCP address to the terminal mobile device. This completes a TCP/IP link.

Step 7. The Application executing on the AS then queries the "voice only" device via the appropriate Client Proxy Server/DPO program that in this case would support voice recognition and synthesis as its user interface.

Step 8. The user says "I want to make a call". This is packetized and transmitted to the AS where the CPS voice recognition module translates this voice request into application commands.

Step 9. The application asks "Whom should I call?" This is sent back as a digital audio stream and is decoded at the "voice only" device into analog audio so that the user can understand it.

Step 10. The user may then either provide name e.g. "call Bill Smith" or a number "925-555-1212".

Step 11. A phone call is thus placed and a voice (Voice over IP or VoIP) connection established

EXAMPLE 2

A Data Access Application Using a "Voice Only" Device

The same steps outlined in the previous example would be executed to establish a TCP/IP based link with the specific application URL.

In this case because the device type is known to be a "voice only" device it will not accept any graphical input. The application interface now gets routed through a voice module on the AS that does the conversion of voice to text and data to voice. Clearly graphics cannot be supported on this type of device. However most data based applications such as e-mail, SMS, news delivery, stock quotes etc. can be easily supported. Thus, the application gracefully scales the features available to a specific mobile access device. The user is only exposed to the features that his mobile device can support.

EXAMPLE 3

Access Using a PDA Type Device That Can Support Graphics

The same steps as before would be followed to establish the TCP/IP link. In this case however, the CPS/DPO program pair knows that the mobile device has graphics capability and therefore present data in a format supported by the specific device. A device of this sort would be capable of supporting voice as well as data.

Figure 3:
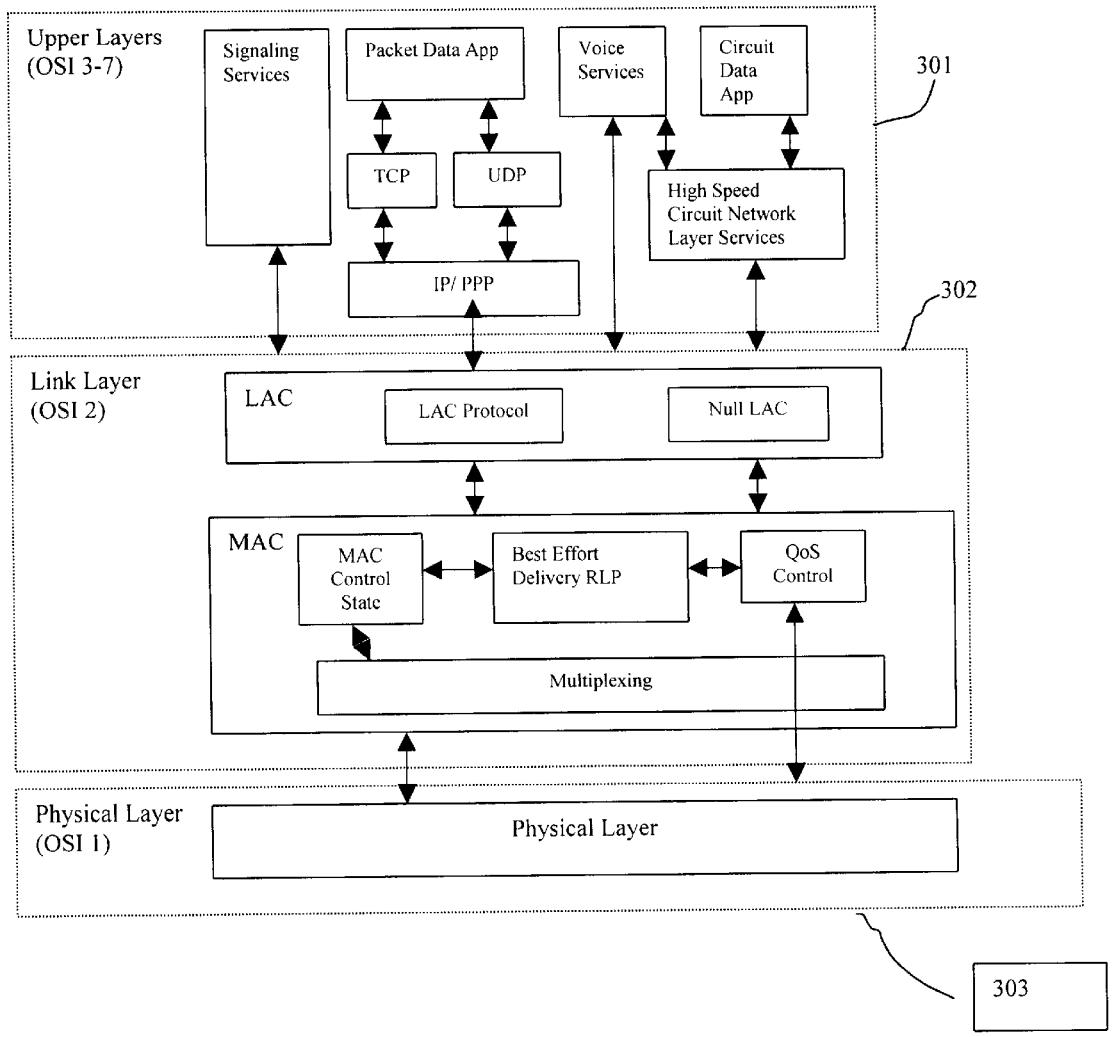
FIG. 3 is a diagram of a typical protocol stack required to implement an IS-95 cdma or a CDMA2000 wireless network.

An example of the protocol stack required to support an IS-95 cdma or CDMA 2000 wireless IP network is shown in FIG. 3. FIG. 3 illustrates the Upper Layer OSI 3-7, the Link layer)SI and the Physical Layer OSI 1. The abbreviations used in FIG. 3 are as follows:

LAC—Link Access Control
MAC—Medium Access Control
OSI—Open Systems interconnect
PPP—Point-to-Point Protocol
QoS—Quality of Service
RLP—Radio Link Protocol
TCP—Transmission Control Protocol
UDP—User Datagram Protocol Such software stacks are well known. For example see a book by Vijay K. Garg-"IS-95 Cellular/PCS Systems Implementation; Prentice Hall PTR"; 2000. The above book is hereby incorporated herein by reference.

Figure 9:
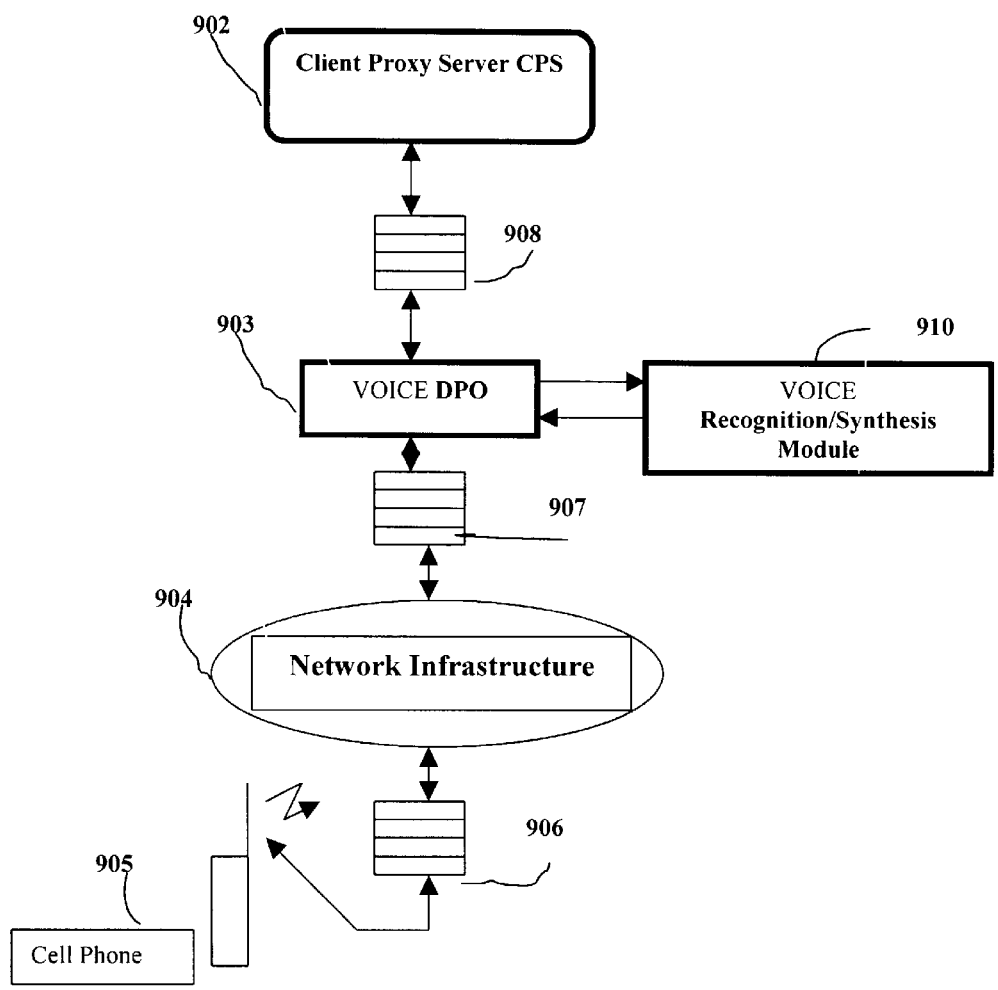
FIG. 9 is a block diagram showing an example of the operations performed.

FIG. 9 is a block diagram illustrating an example of how a mobile device accesses the target application for service. That is, FIG. 9 is a representation of the connecting blocks data flow between the Application and the mobile device in use. The example illustrated in FIG. 9 involves a mobile access device in the form of a cell phone 905. The cell phone 905 connects to the wireless IP network and all the associated network infrastructure 904 and finally to the application server and the specific CPS/DPO program pair 902,903 associated with this particular mobile device 905. The DPO 903, on the one side, connects to the TCP/IP layer at the Application Server and on the other it connects to the CPS 902 executing on that server.

The CPS 902 interfaces with the target application program 901 and its associated data. The user connects to the network and selects the desired application following the steps shown in FIG. 8. The mobile device in this example is a voice-only cell phone 907 that is designed in accordance with the present invention.

The users voice commands are digitized by the mobile device, packetized and transmitted through the network infrastructure 904 onto the device's DPO 903 as IP-packets via the paths 906 and 907. The physical path 906 is an abstraction of the network infrastructure that is involved in delivering the IP-packets to the target application server. The path 907 represents the TCP/IP buffers queues. The DPO 903 extracts a packet from the buffer 907 and parses the incoming mobile device packet. It extracts all device dependent information and spawns any necessary programs required to support the mobile device e.g. a voice recognition/voice synthesis program 910 to provide a voice-only user interface. The DPO 903 then maps the IP-packet payload data into a device-independent payload that it sends to the CPS 902 for session and presentation layer control through a buffer mechanism 908 The CPS 902 parses this incoming packet and decides upon which application 901 it must invoke. It then formats the payload data into a format e.g. a series of XML commands that the application 901 accepts and responds to and sends them to the application via a buffer mechanism represented by 909.

The application 901 will respond to the XML commands with the appropriate response via the buffer mechanism 909. The CSP902 will then process and translate the payload for processing by the DPO 903. The DPO 903 will process the payload and pass it thru any special program e. the voice recognition/voice synthesis module 910 for device specific processing. In this example the application data is converted from text to voice. by the voice recognition/synthesis module 910. The output of this module 910 may then is then a compressed bit stream. This bit stream is buffered and packetized into IP packets and sent back to the mobile device 905. The ASD in the mobile device extracts the payload from the IP-packet and transform extracted the digital bit stream into an audio signal. This process is repeated as many times as required during a user session.

While the invention has been shown and described with respect to preferred embodiments thereof, those skilled in the art will understand that various other changes in form and detail may be made without departing from the spirit and scope of the invention. The scope of the invention is limited only by the appended claims.

We claim:

1. A system including a wireless access network that supports a plurality of portable devices, each said portable device incorporating a software configurable radio module that supports multiple wireless and data access protocols including wireless LAN protocols or wireless cellular WAN protocols;

each said portable device capable of sending and receiving a payload containing data and commands, and said payload being embedded within a standard Internet Protocol (IP) packet for compatibility with existing Internet Protocol routing mechanisms for internet communication;

at least one set of distributed Function server or base station and Application server and said at least one set of distributed Function server and Application server capable of executing at least one set of software programs including a Device Personality Object (DPO) software program and a Client Services Proxy Object (CSPO) software program which provide internet communication for each said portable device;

each said portable device incorporating a packetizer/depacketizer module for processing, sending and receiving said payload embedded in said standard IP packets exchanged between said at least one set of distributed Function server or base station and Application server and said portable device;

a communication protocol for sending and receiving said payload between said portable device and said at least one set of Function server or base station executing said at least one set of Device Personality Object (DPO) software and said corresponding Application server executing said Client Services Proxy Object (CSPO) software;

said at least one set of Device Personality Object (DPO) software and Client Services Proxy Object (CPSO) software providing internet communication between said portable device and a target internet application program or service;

whereby, said portable device merely functions as a minimal input/output device, which when combined with said at least one set of Device Personality Object software (DPO) and Client Services Proxy Object (CSPO) software processes said standard IP packets containing said embedded payload, for sending and receiving data over the internet in order to provide compatible access to target application programs and services available on the internet, in a manner where associated computation, data manipulation and storage required to service said portable device is performed on said at least one set of distributed Function server and Application server distributed in said network.

2. The system recited in claim 1 where each of said portable devices includes a Software Defined Radio that automatically configures the portable device for a particular radio communication protocol selected from a plurality of available wireless radio communication protocols including wireless LAN protocols or wireless cellular WAN protocols;

said radio communication protocol is supported by an available wireless access point and said software defined radio in combination with its associated said at least one set of Device Personality Object (DPO) software and Client Service Proxy Object software executing on said at least one set of distributed Function server or base station and Application server, sends and receives said standard IP packets which include said payload sent and received by said portable devices to communicate with other components in said network.

3. The system recited in claim 1 where each of said portable devices includes an Application Specific Device module that identifies the functional characteristics such as the input/output capabilities, display capabilities and the associated data transformation requirements of the particular said portable device to the target said at least one set of distributed Function server or base station and Application servers for proper service.

4. A system which includes a plurality of portable devices, said portable devices having a plurality of input/output and processing characteristics and at least one input/output device;
   each said portable device incorporating a software configurable radio module that supports multiple wireless and data access protocols including wireless LAN protocols and wireless cellular WAN protocols;
   each said portable device capable of sending and receiving a payload containing data and commands, and said payload being embedded within a standard Internet Protocol (IP) packet for compatibility with existing Internet Protocol routing mechanisms for internet communication;
   at least one set of distributed Function server or base station and Application server; and;
   said at least one set of distributed Function server or base station and Application server capable of executing at least one set of software programs including a Device Personality Object (DPO) software program and a Client Services Proxy Object (CSPO) software program which provide internet communication for each said portable device; each said portable device incorporating a packetizer/de-packetizer module for processing, sending and receiving said payload embedded in said standard IP packets exchanged between said at least one set of distributed Function server or base station and Application server and said portable device;
   a communication protocol for sending and receiving said payload between said portable device and said at least one set of distributed Function server executing said at least one set of Device Personality Object (DPO) software and said corresponding Application server executing said Client Services Proxy Object (CSPO) software;
   said at least one set of Device Personality Object (DPO) software and Client Services Proxy Object (CPSO) software providing internet communication between said portable device and target internet application program or service;
   a communication protocol that supports the generation and processing of said standard IP packets including said payload by combining functions of said portable device and its corresponding said at least one set of Device Personality Object software and Client Service Proxy Object software executing on said at least one set of distributed Function server base station and Application server, providing a network access point for said portable device;
   whereby, said at least one set of distributed Function server or base station and Application server is selected by either physical proximity to said portable device or by the quality of the communication channel between said at least one set of distributed Function server or base station and Application server and said portable device, to provide a network connection for said portable device;
   whereby an input to said portable device is formatted and assembled into said payload and transmitted to said at least one set of Device Personality Object (DPO) software executing on the said at least one set of distributed Function server and Application server providing said network connection to said portable device;
   whereby said Device Personality Object (DPO) software, executing on said at least one set of distributed Function server and Application Server, assembles said standard IP packet, complete with IP packet header and including said payload generated by said portable device and creates an IP request packet;
   whereby said IP request packet is routed to said associated Client Services Proxy Object (CSPO) software executing on said at least one set distributed Function Server and Application server;
   whereby said at least one set of Client Services Proxy Object (CSPO) software processes said received IP request packet into an appropriate format for an application program request protocol or service request protocol and forwards the said IP request packet to a target application program or service provider;
   whereby a response from a target application program or service is processed by said associated Client Services Proxy Object (CSPO) software and reformatted into a new response using said standard IP packet including said IP header and a response payload to be sent to the said portable device that generated said request and associated data;
   said IP response packet is sent back to said associated Device Personality Object (DPO) executing on said at least one set of distributed Function server or base station and Application server, which processes said response payload containing application or service data contained in said IP packet, formats said response payload to ensure that said response payload is compatible with data and format required by intended said portable device and forwards said response payload to said portable device, which converts said response payload into an appropriate output stream;
   said at least one set of Device Personality Object (DPO) software and Client Services Proxy Object (CSPO) software, being providing hardware and access protocol independence between said portable devices and internet applications and services executing on said at least one set of distributed Function server or base station and Application server, whereby said portable devices with a plurality of input-output characteristics and functions are able access the same internet applications and services without the need to rewrite said applications and services to accommodate the individual input-output characteristics of each individual said portable device type;
   said at least one set of Device Personality Object (DPO) software and Client Services Proxy Object (CSPO) software providing a mapping between the input and output characteristics expected by the said application program or service being requested and the actual input and output characteristics of said portable devices requesting access to said applications and services and permitting graceful interaction.

5. The system recited in claim 4 where each of said portable devices includes a Software Defined Radio that automatically configures the portable device for a particular radio communication protocol selected from a plurality of available wireless radio communication protocols including wireless LAN protocols or wireless cellular WAN protocols;

said radio communication protocol is supported by an available wireless access point and said software defined radio in combination with its associated said at least one set of Device Personality Object (DPO) software and Client Service Proxy Object software executing on said at least one set of distributed Function server or base station and Application server, sends and receives said standard IP packets which include said payload sent and received by said portable devices to communicate with other components in said network.

6. The system recited in claim 4 where each of said portable devices includes an Application Specific Device (ASD) module that identifies the functional characteristics such as the input/output capabilities, display capabilities and the associated data transformation requirements of the particular said portable device to the target said at least one set of distributed Function server or base station and Application servers for proper service.

7. A system including, a plurality of portable devices, a centralized application and services mechanism implemented as at least one set of distributed Function server or base station and Application server that provides a virtual central server infrastructure;

each said portable device incorporating a software configurable radio module that supports multiple wireless and data access protocols including wireless LAN protocols and wireless cellular WAN protocols;

each said portable device capable of sending and receiving a payload containing data and commands, and said payload being embedded within a standard Internet Protocol (IP) packet for compatibility with existing Internet Protocol routing mechanisms for internet communication;

said at least one set of distributed Function server or base station and Application server executing at least one set of software programs including a Device Personality Object (DPO) software program and a Client Services Proxy Object (CSPO) software program which provide internet communication for each said portable device;

a radio communication network for transmitting and receiving said payload embedded within said standard IP packets between said portable devices and said virtual central server;

a plurality of application programs and services available on said virtual central server infrastructure;

said at least one set of Device Personality Object (DPO) software and Client Services Proxy Object (CSPO) software executing on the virtual central server infrastructure, processing input and output messages and providing the processing required to present data in the appropriate format and using the correct protocol between said portable devices and a plurality of application programs and services, whereby said portable device serves as input/output device, communicating with said central server infrastructure using standard IP packets with said embedded payload and computation and data storage associated with said application is performed on the said at least one set of distributed Function server or base station and Application servers that form said virtual central server infrastructure; and whereby said portable devices can be very simple low-cost devices with minimal input/output capability and can still provide full access to said application programs and services while consuming very low amounts of power.

8. The system recited in claim 7 where each said portable devices includes a Software Defined Radio that automatically configures the portable device for a particular radio communication protocol selected from a plurality of available wireless radio communication protocols including wireless LAN protocols or wireless cellular WAN protocols;

said radio communication protocol is supported by an available wireless access point and said software defined radio in combination with its associated said at least one set of Device Personality Object (DPO) software and Client Service Proxy Object software executing on said at least one set of distributed Function server or base station and Application server, sends and receives said standard IP packets which include said payload sent and received by said portable devices to communicate with other components in said network.

9. The system recited in claim 7 where each of said portable devices includes an Application Specific Device (ASD) module that identifies the functional characteristics such as the input/output capabilities, display capabilities and the associated data transformation requirements of the particular said portable device to the target said at least one set of distributed Function server or base station and Application servers for proper service.

10. A method of providing a plurality of portable devices connection to standard Application programs and Services available on computer servers distributed throughout a network including at least one set of distributed Function server or base station and Application server;

whereby said at least one set of distributed Function server or base station and Application server appear to be a virtual central server; said virtual central server including at least one Application program or Service;

at least one set of Device Personality Object (DPO) software and Client Services Proxy Object (CSPO) software executing on said virtual central server infrastructure, processing input and output messages and providing the processing required to present data in the appropriate format and using the correct protocol between said portable devices and said standard applications and services;

each said portable device having input and output capability and each said portable device not including a web browser function or web browser program;

each said portable device with its associated said at least one set of Device Personality Object software and Client Services Proxy Object software executing on said at least one set of distributed Function server or base station and Application server, generating and receiving standard IP packets containing payload originated by or received at said portable device;

said Client Service Proxy Object software extracting said payload from the received IP packet at said Application or Service server, parsing and formatting the commands embedded in the payload to generate a particular protocol stream required to interact with target application program or service and generate response to the requesting said portable device;

said Client Service Proxy Object software generating IP packets including said payload specific to a particular said portable device after appropriate processing of the output of said target application program or service and forwarding such IP packets for further payload processing, data transformation and streaming per formed by said Device Personality Object (DPO) associated with particular said portable device to provide device specific output packet stream to said portable device for presentation to the user of said portable device;

whereby said portable devices communicate with standard application programs and services available as a virtual central resource.

* * * * *